(12) United States Patent
Madni et al.

(10) Patent No.: US 7,015,832 B2
(45) Date of Patent: Mar. 21, 2006

(54) PULSE WIDTH MODULATION BASED DIGITAL INCREMENTAL ENCODER

(75) Inventors: Asad M. Madni, Los Angeles, CA (US); Jim B. Vuong, Northridge, CA (US); Philip Vuong, Northridge, CA (US)

(73) Assignee: BEI Sensors & Systems Company, Inc., Sylmar, CA (US)

( * ) Notice: Subject to any disclaimer, the term of this patent is extended or adjusted under 35 U.S.C. 154(b) by 0 days.

(21) Appl. No.: 10/853,330

(22) Filed: May 25, 2004

(65) Prior Publication Data

US 2005/0275568 A1 Dec. 15, 2005

(51) Int. Cl.
*H03M 1/10* (2006.01)
(52) U.S. Cl. .......................................... 341/11; 341/16
(58) Field of Classification Search ................. 341/120
See application file for complete search history.

(56) References Cited

U.S. PATENT DOCUMENTS 5,280,238 A * 1/1994 Tsuchiya et al. ....... 324/207.24
6,304,076 B1 10/2001 Madni et al.

OTHER PUBLICATIONS

Asad M. Madni, et al., *The Next Generation of Position Sensing Parts 1 and 2*: SENSORS The Journal of Applied Sensing Tchnology, Mar. & Apr. 2001, vol. 18, No. 3 & 4, An Advanstar Publication, 16 pages.

* cited by examiner

*Primary Examiner*—Peguy JeanPierre
*Assistant Examiner*—Joseph Lauture
(74) *Attorney, Agent, or Firm*—Christie, Parker & Hale, LLP

(57) ABSTRACT

A digital incremental encoder for generating an output signal indicative of an angular position, a direction of rotation, and a speed of rotation of a shaft. A counter receives a PWM signal indicative of the angular position of the shaft and a clock signal from an angular position sensor, and generates a multi-bit output. A latch latches the multi-bit output, a first bit and a second bit of which are used to generate the output signals that include the first bit. The first bit and the second bit may be XOR'd together to generate an XOR output included in the output signals. A direction of rotation may be derived from a quadrature phase relationship between the first bit and the XOR output. The angular position sensor may be an NCAPS or MT-NCAPS. A linear position sensor may be used instead of an angular position sensor to generate the PWM signal.

21 Claims, 4 Drawing Sheets

PULSE WIDTH MODULATION BASED DIGITAL INCREMENTAL ENCODER

FIELD OF THE INVENTION

This invention is related to position measurement, and more particularly to a digital incremental encoder for deriving position, speed and direction information from a pulse width modulation (PWM) signal generated by a position sensor.

BACKGROUND OF THE INVENTION

For the measurement of angular position, incremental encoders are commonly used. The incremental encoders are mechanical devices that create a number of square waves corresponding to the detected mechanical increments.

Conventional incremental encoders are based on optical technology. An optical incremental encoder includes a patterned encoder disc mounted on a shaft and optical sensors. As the disk rotates via the shaft, the tracks on the disk interrupt the beams between the photo emitter-detector pairs, thereby producing sequences of digital pulses, i.e., square waves. The faster the disc rotates, the higher the frequency of the output square waves. Hence, the frequency of the square waves is proportional to the rotational speed of the disc. The square waves can be converted to relative position measurement.

The optical incremental encoders typically use optical gratings to produce two square wave signals which vary with the position of the shaft. FIG. 1 shows how the two signals vary as the shaft rotates. The Two channels, A and B, are in quadrature for position sensing, that is, out of phase by 90°, which produces four distinct states 10, 20, 30 and 40 within each cycle.

This quadrature phase relationship can be used to derive the direction of rotation, clockwise or counter-clockwise. Using the phase information, it can be determined whether A leads or lags B and thus the direction of rotation. By way of example, it can be seen in FIG. 1 that the square wave A leads the square wave B by 90 degrees. A third channel, namely, an index channel, provides an once-per-revolution signal that can be used to count the number of turns of the shaft.

In general, higher resolution can be obtained by placing more tracks on the disc. However, the number of tracks per revolution is limited by physical line spacing and quality of light transmission.

Therefore, it is desirable to provide an incremental encoder that has an improved resolution per revolution, and also has increased stability over that of optical incremental encoders.

SUMMARY OF THE INVENTION

In an exemplary embodiment of the present invention, a digital incremental encoder generates output signals indicative of an angular position, a direction of rotation, and a speed of rotation of a shaft. The digital incremental encoder includes a counter for receiving a PWM signal indicative of the angular position of the shaft and a clock signal from an angular position sensor, and generates a multi-bit output. The digital incremental encoder also includes a latch for latching the multi-bit output. The output signals are generated using a first bit and a second bit of the latched multi-bit output, and include the first bit.

In another exemplary embodiment of the present invention, a digital incremental encoder system generates output signals indicative of an angular position, a direction of rotation, and a speed of rotation of a shaft. The digital incremental encoder system includes an angular position sensor for generating a PWM signal indicative of the angular position of the shaft and a clock signal. A counter receives the PWM signal and the clock signal, and generates a multi-bit output. A latch is used to latch the multi-bit output. The output signals are generated using a first bit and a second bit of the latched multi-bit output, and includes the first bit.

In yet another exemplary embodiment of the present invention, a method of generating output signals indicative of an angular position, a direction of rotation, and a speed of rotation of a shaft is provided. A PWM signal indicative of the angular position of the shaft and a clock signal are received. Counting a number of cycles of the clock signal is started in response to a first transitional edge of the PWM signal from a first state to a second state. The counting of the number of cycles continues while the PWM signal remains at the second state to generate a multi-bit output representing the number of cycles counted. The multi-bit output is latched, and a first bit and a second bit of the latched multi-bit output are used to generate the output signals, which include the first bit.

In still another exemplary embodiment of the present invention, a digital incremental encoder for generating output signals indicative of a linear position, a direction of linear translation, and a speed of linear translation of the linear position being monitored by a linear position sensor, is provided. A counter receives a PWM signal indicative of the linear position and a clock signal from the linear position sensor, and generates a multi-bit output. A latch latches the multi-bit output, and a first bit and a second bit of the latched multi-bit output are used to generate the output signals, which include the first bit.

These and other aspects of the invention will be more readily comprehended in view of the discussion herein and accompanying drawings.

DETAILED DESCRIPTION OF THE INVENTION

In exemplary embodiments of the present invention, instead of using the above referenced optical encoding technique, a PWM signal generated using an angular position sensor is used for incremental encoding. The PWM signal includes angular position information of a rotating disk on a shaft in PWM format with analog resolution. A PWM based digital incremental encoder receives the PWM signal, and uses it to derive information on the speed and direction of rotation.

The PWM signal and a high speed clock signal are applied to a counter in the digital incremental encoder to generate a multi-bit output which varies in accordance with the duty cycle of the PWM signal. For instance, the value of the multi-bit output corresponds to the number of clock cycles counted while the PWM signal is at a high state, and therefore, indicates the angular position of the rotating disk. The counter is also used to decode in digital form the direction and speed of rotation measured by the angular position sensor. The multi-bit output is latched in a latch, and square waves having a quadrature phase relationship similar to that of an optical incremental encoder are generated. In this manner, a digital incremental encoder is realized without using optical devices and a patterned encoder disc.

By way of example, a PWM signal may be provided by a non-contact angular position sensor (NCAPS) such as the one disclosed in U.S. Pat. No. 6,304,076 entitled "Angular Position Sensor with Inductive Attenuating Coupler" or a multi-turn (MT) NCAPS disclosed in a commonly owned, co-pending U.S. patent application Ser. No. 10/813,329 entitled "Programmable, Multi-Turn, Pulse Width Modulation Circuit for a Non-Contact Angular Position Sensor" filed Mar. 29, 2004 and published on Sep. 29, 2005 as U.S. Patent Application Publication No. US 2005/0212577, the entire contents of both of which are incorporated by reference herein. The PWM signal may also be provided by any other angular or linear position sensor having a suitable PWM output.

Figure 1:
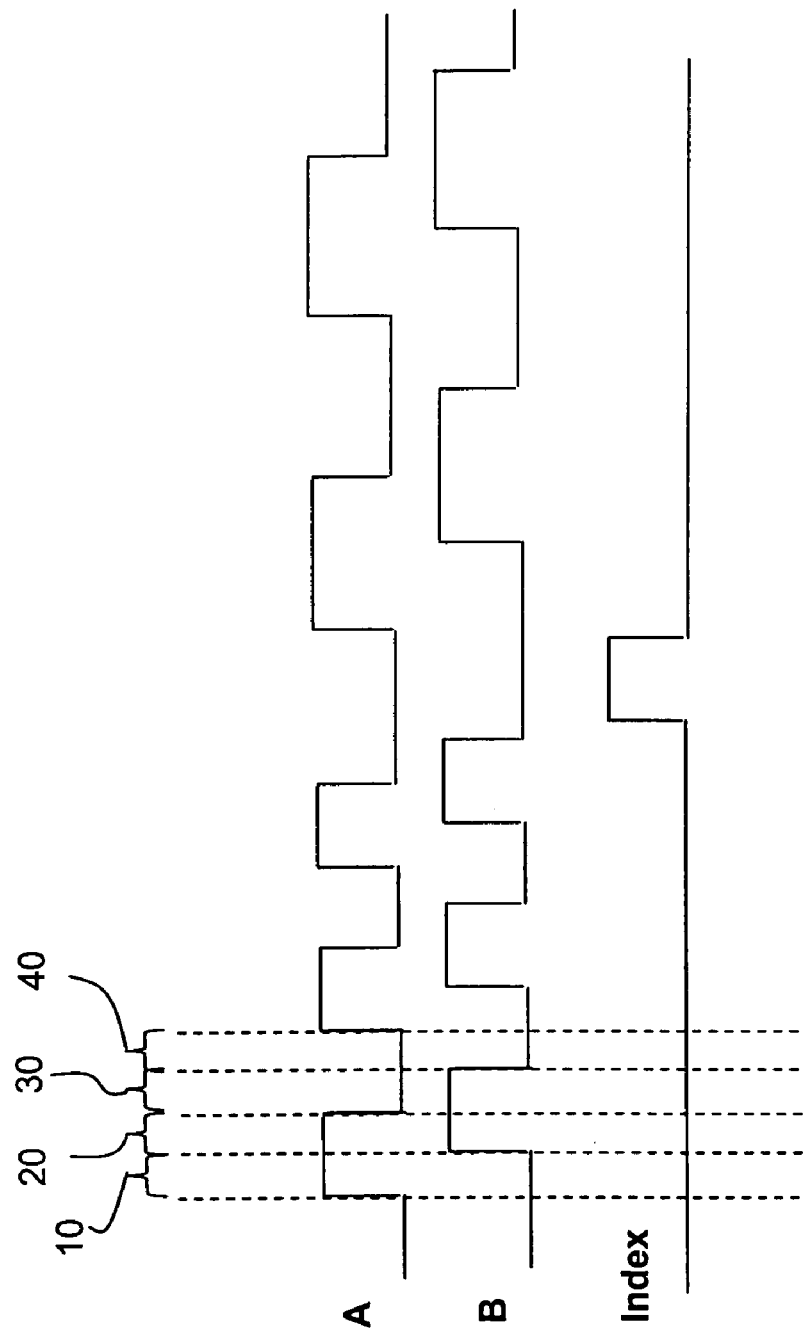
FIG. 1 illustrates output waveforms of an incremental encoder.
Figure 2:
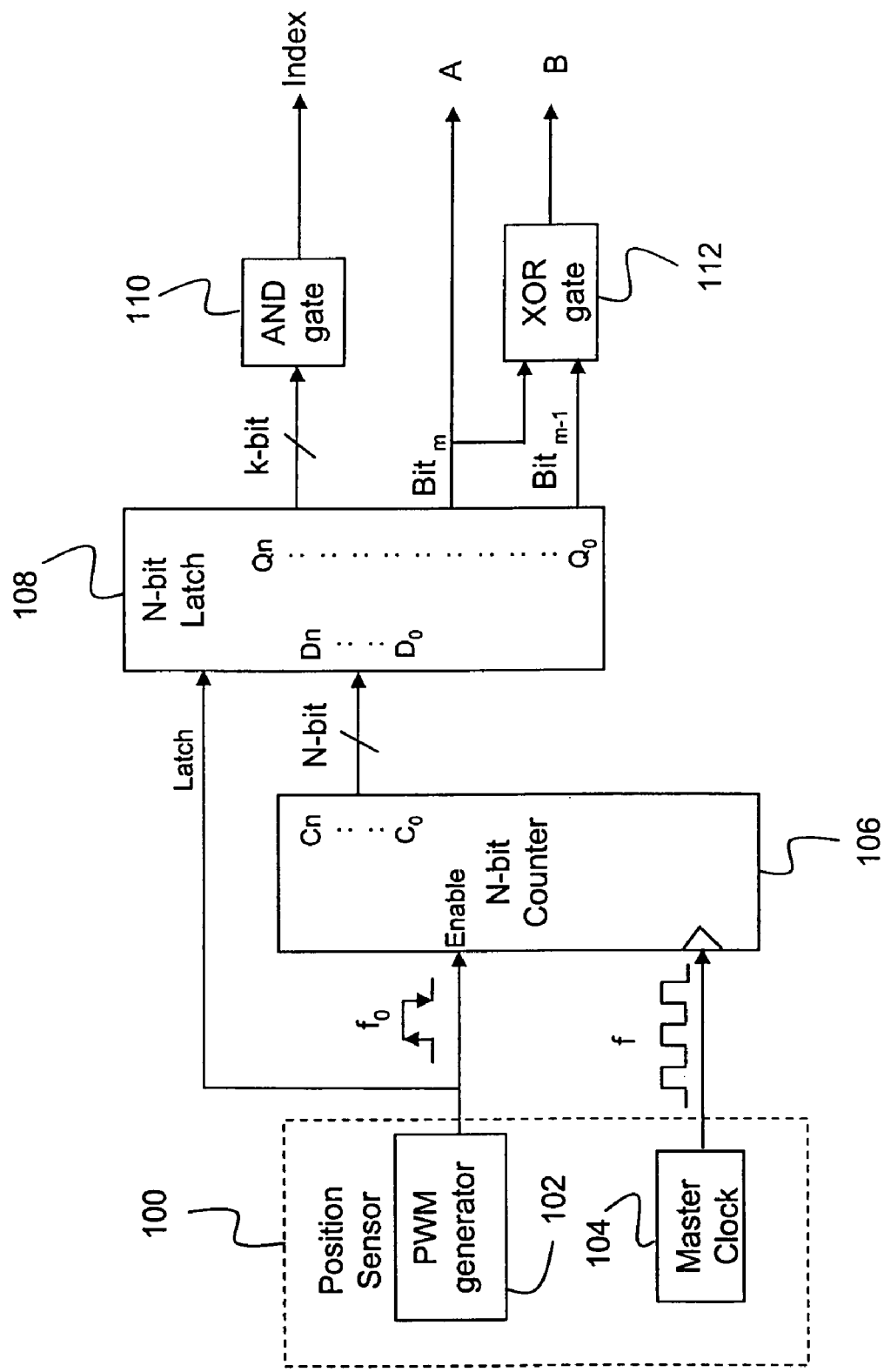
FIG. 2 is a block diagram of a digital incremental encoder based on PWM in an exemplary embodiment of the present invention.

FIG. 2 is a block diagram of a digital incremental encoder based on a position sensor 100 that provides a PWM output. The position sensor 100 may be an angular position sensor such as, for example, NCAPS or MT-NCAPS. The position sensor 100 may also be a linear position sensor or any other suitable position sensor.

The position sensor 100 includes a PWM generator 102 having frequency $f_0$ and a master clock 104 having frequency f. In addition to the position sensor 100, the digital incremental encoder includes an N-bit counter 106, an N-bit latch 108, an AND gate 110 and an Exclusive-Or (XOR) gate 112. The N-bit counter 106, for example, may be an up/down counter. Here, N corresponds to the number of bits that can represent a maximum count corresponding to a 100% PWM duty cycle.

By way of example, The maximum count for a full cycle rotation can be derived by the following equation:

$$\text{maximum count} = \frac{\text{Period of the } PWM}{\text{Period of the master clock}}.$$

In other words, for a PWM signal having a period $P_1$ and a master clock signal having a period $P_2$, the maximum count for representing a 100% PWM duty cycle corresponds to a number of clock cycles that would fit within one PWM period (e.g., one 360 degree rotation of a single-turn angular position sensor). Hence, if the maximum count is 4095, N should be 12 so that $2^N(=(2)^{12}=4096)$ is sufficiently large to represent 4095.

The N-bit counter 106 receives the PWM output of the PWM generator 102 as its Enable input, and a clock output of the master clock 104 as its clock input. Hence, the N-bit counter 106 counts the number of clock cycles received during the time the N-bit counter 106 is enabled. In other words, while the PWM output stays high, the N-bit counter 106 counts up the number of clock cycles received, and while the PWM output stays low, the N-bit counter 106 does not count up. Further, the N-bit counter is reset in response to the falling edge of the PWM output. Since the value of the multi-bit output varies in accordance with the duty cycle of the PWM signal, the multi-bit output value indicates the angular position measured by the angular position sensor.

The N-bit latch 108 receives an output $[C_0 \ldots C_n]$ of the N-bit counter 106 and the PWM output of the PWM generator 102. The output of the N-bit counter 106 is received as input $[D_0 \ldots D_n]$ and latched in the N-bit latch 108 responsive to each falling edge of the PWM output. The N-bit latch 108 outputs an output $[Q_0 \ldots Q_n]$.

The simplest type of encoding may have only one channel output "A". Referring to FIG. 2, the signal "A" is taken from one of the outputs $[Q_0 \ldots Q_n]$ of the N-bit latch 108 (e.g., $Bit_m$). The $Bit_m$ is referred to as the output bit position of the N-bit latch. By way of example, if m=2 then the third least significant bit output of the N-bit latch is used as the "A" signal output. The selection of this bit position will be further discussed below in connection with the derivation of a formula for the resolution of the encoder.

When a PWM signal having frequency $f_0$, with 0% to 100% duty cycle, is applied to the Enable input of the N-bit counter 106, the rising edge of the PWM signal triggers the counter and so the counter starts counting up. The state of signal "A" does not change at this time. When the PWM signal goes low, this will latch the current value of the counter in the N-bit latch 108, and reset the N-bit counter 106. At the same time, the state of $Bit_m$ of the N-bit latch is being updated to either high or low based on the current value latched from the counter, so that it will create a train of pulses at the signal "A" output with the rate that is proportional to the speed of the variation of the PWM signal as illustrated in FIG. 3.

Figure 3:
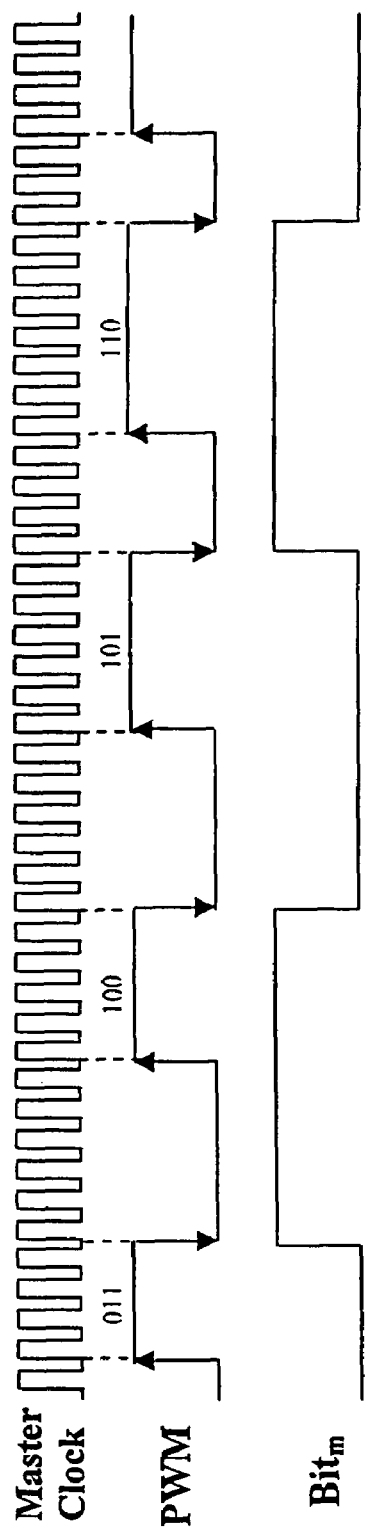
FIG. 3 illustrates an output waveform of the digital incremental encoder of FIG. 2, shown in reference to a master clock and an input PWM signal.

It can be seen in FIG. 3 that the state of $Bit_m$ changes each time the N-bit latch 108 latches the output of the N-bit counter 106. This is because the variation to the duty cycle of the PWM signal is captured by the N-bit counter 106 at such a resolution that the clock cycles of the master clock 104 counted by the N-bit counter 106 either increases by one or decreases by one between two subsequent latching by the N-bit latch 108.

Describing FIG. 3 in detail in reference to FIG. 2, the first PWM pulse corresponds to binary "011" since the N-bit counter 106 counts three clock cycles between the rising and falling edges of the first PWM pulse. The state of $Bit_m$ changes from 0 to 1 in response to the falling edge of the first PWM pulse because the N-bit latch 108 latches in response to falling edges. Also, the N-bit counter 106 is reset in response to the falling edges of the PWM signal.

Between the rising and falling edges of the second PWM pulse, the N-bit counter 106 counts four clock cycles (corresponding to binary "100") of the master clock. The $Bit_m$, changes its state from 1 to 0 in response to the falling edge of the second PWM pulse when the N-bit latch 108 is latched. The N-bit counter 106 counts five clock cycles ("101") and six clock cycles ("110"), respectively, between the rising and falling edges of the third and fourth PWM pulses. For the third and fourth PWM pulses, the $Bit_m$ switches state (from 0 to 1 and then from 1 to 0) in response to the falling edges only, as is the case for the first and second (and all other) PWM pulses.

In this manner, a digital square wave is obtained, which is similar to a square wave produced in a conventional manner by a track on a disc of an optical encoder that passes over an optical sensor. The faster the PWM changes, the higher is the frequency of the signal "A", and the angular displacement of the disc is proportional to the output value of the counter when it is latched.

However, a single channel incremental encoder cannot provide direction information as to whether a shaft rotates clockwise or counter-clockwise. Because of this lack of flexibility of a single channel incremental encoder, in the present invention, a dual channel incremental encoder (quadrature encoder) has been introduced that provides the speed and direction of rotation of the shaft. The two channels, A and B, are arranged 90 degrees out of phase in such a way as to determine the direction of rotation by assessing which channel leads or lags the other. Using this information, the direction of rotation of the incremental encoder can be obtained and the angular motion can be measured by counting the number of pulses from the channels.

The digital incremental encoder having two channel outputs may also be referred to as a dual channel incremental encoder or a quadrature encoder. In one exemplary embodiment, the dual channel incremental encoder is provided by combining m and (m−1) bits of the N-bit latch 108 through the XOR gate 112. The basic operation of the dual channel encoder is similar to the single channel technique. The rising edge of the PWM signal triggers the counter to start counting and the falling edge of the PWM signal resets the counter and latches in a new value for updating the dual channel output.

Figure 4:
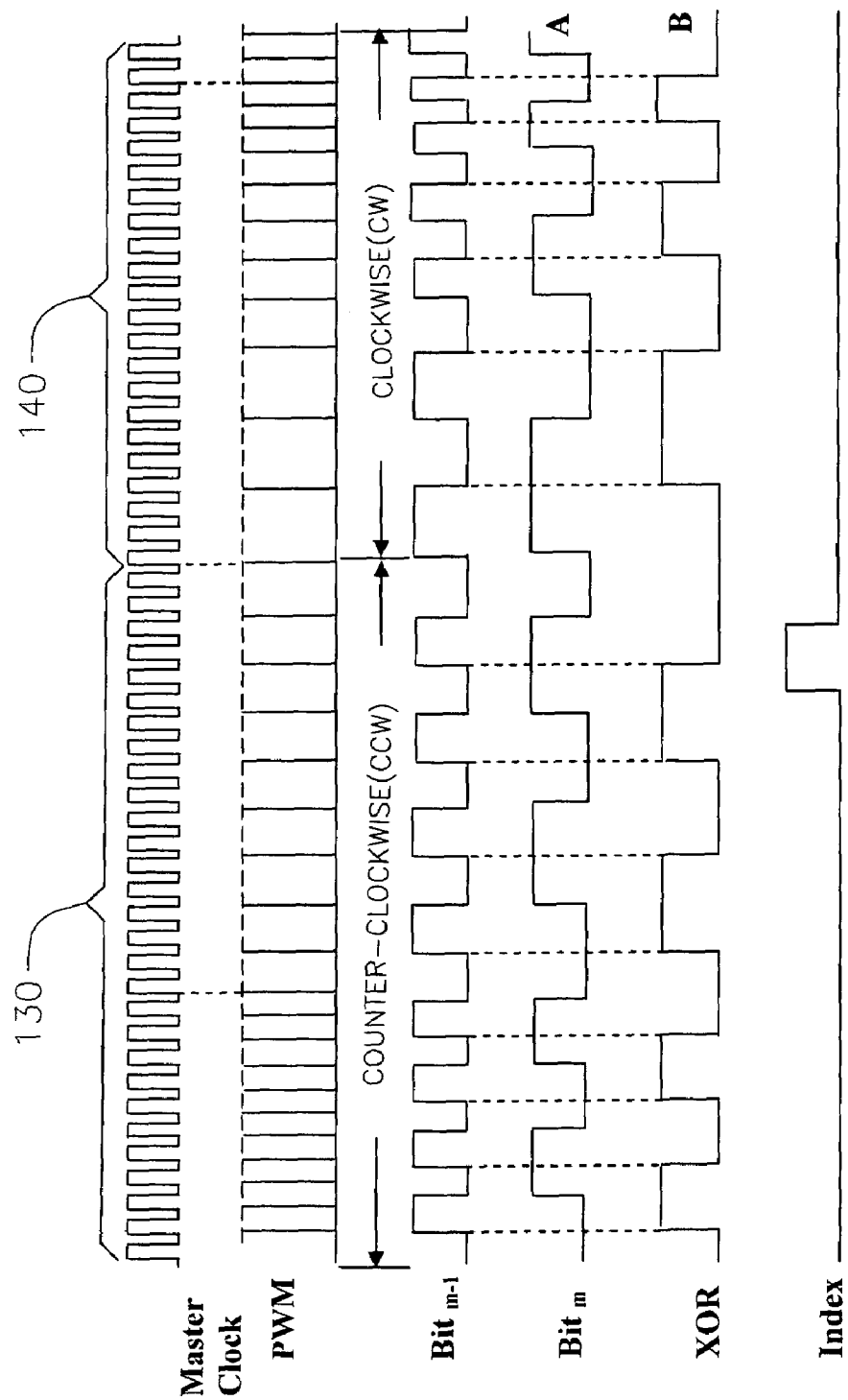
FIG. 4 is timing diagram illustrating output waveforms of the digital incremental encoder of FIG. 2.

FIG. 4 illustrates the relationship between the states of these two channels. FIG. 4 illustrates two distinct time periods 130 and 140. The waveform labeled PWM does not represent a true PWM waveform, but is intended to show the relationship between the duty cycle variation of the PWM signal and the direction of rotation (i.e., whether A lags or leads B). It can be seen in FIG. 4 that during the first time period 130, the PWM signal becomes progressively thicker as a result of a counter-clockwise rotation. It can also be seen that during a second time period 140, the PWM signal becomes progressively thinner as a result of a clockwise rotation.

With $Bit_m$ used as a signal A, the XOR combination of $Bit_m$ with $Bit_{m-1}$ produces a second signal B, which is a quarter cycle out of phase with respect to signal A, since the frequency of $Bit_{m-1}$ is twice as fast as that of $Bit_m$. This quadrature arrangement between the signals A and B can be used to determine clockwise or counter-clockwise direction of rotation. For instance, the direction of rotation can be determined by the level of one signal during the edge transition of the second signal. The encoder is rotating in the counter-clockwise direction when B leads A and in the clockwise direction when A leads B. Therefore, utilizing quadrature detection on a two-channel encoder provides reliable directional information.

The digital incremental encoder of FIG. 2 also outputs an Index signal on a third output channel. The Index signal is generated when the PWM reaches its maximum duty cycle corresponding to a full cycle of rotation. An AND gate 110 is used to AND together the k-bit binary code corresponding to the 100% PWM duty cycle to yield an output of one pulse per revolution. This index output is useful as a reference in defining a home base or zero position of the encoder. The k bits are not necessarily contiguous, and may also include the $Bit_m$ and $Bit_{m-1}$ bits.

In general, the digital incremental encoder based on an angular position sensor such as NCAPS can provide higher resolution than the traditional optical incremental encoder due to the fact that the PWM output characteristic of the NCAPS is analog. Typically, the resolution of the PWM based digital incremental encoder is defined by the master clock frequency f because the resolution that can be achieved by the encoder is directly proportional to the clock frequency. This resolution can be defined by:

$$R = \frac{P1}{2^n * P2}$$

where R is the resolution of the encoder, $P_1$ is period of the PWM generator, m is the position of the bit used for signal encoding (m≧1), and $P_2$ is period of the master clock.

For example, if a 2.22 kHz PWM signal is applied to the counter with a 36 MHz master clock and the output signal is defined by the third least significant bit, then m=2, $$P_1 = \frac{1}{2.22 \text{ kHz}} = 450 \text{ μs and } P_2 = \frac{1}{36 \text{ MHz}} = 0.02727 \text{ μs}.$$

Hence, $$R = \frac{P_1}{2^m * P_2} = \frac{450 \text{ μs}}{2^2 * 0.02727 \text{ μs}} = 4095 \text{ steps}.$$

Therefore, a N=12-bit ($2^{12}$=4096) counter is sufficient to provide a full scale incremental resolution of 4096 steps within 360 degrees of rotation.

Higher degree of angular resolutions can be achieved by using a faster master clock and high performance digital circuit (within the noise floor limitations of the system). It should be noted that in addition to the master clock frequency, the selection of the value of m can have an effect on the resolution of the encoder. The higher the value of m (the higher significant bit of the latch selected as the signal "A" output), the lower is the resolution that the encoder can achieve. It should be noted, however, that the system will be more stable since the lower significant bits of the latch are prone to jitter at the transition edges of the PWM signal and may cause faulty triggering.

The PWM based digital incremental encoder can provide higher resolution at a lower cost than traditional optical incremental encoders. It also has fewer interface problems due to elimination of the optical sensor and emitter set, thereby simplifying the electrical interface design. Furthermore, customizing all the signal processing in an ASIC can provide better measurement performance. Because of these desirable characteristics, the PWM based digital incremental encoder is a suitable and economical for applications for which high performance, resolution, accuracy and repeatability are desired.

While certain exemplary embodiments of the present invention have been described above in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A digital incremental encoder for generating output signals indicative of an angular position, a direction of rotation, and a speed of rotation of a shaft, comprising:
   a counter for receiving a PWM signal indicative of the angular position of the shaft and a clock signal from an angular position sensor, and for generating a multi-bit output; and
   a latch for latching the multi-bit output,
   wherein the output signals are generated using a first bit and a second bit of the latched multi-bit output, the output signals comprising the first bit,
   wherein the first bit and an XOR output generated from the first bit and the second bit have a quadrature phase relationship, the output signals further comprising the XOR output, and
   wherein the direction of rotation of the shaft can be derived from the quadrature phase relationship between the first bit and the XOR output.

2. The digital incremental encoder of claim 1, further comprising an XOR gate for receiving the first bit and the second bit of the latched multi-bit output, and for outputting the XOR output.

3. The digital incremental encoder of claim 1, further comprising an AND gate for receiving and AND'ing a plurality of bits of the latched multi-bit output to generate an index signal indicative of a 360 degree rotation of the shaft,
   wherein the plurality of bits can represent 100% duty cycle of the PWK signal.

4. The digital incremental encoder of claim 1, wherein the counter starts counting the number of cycles of the clock in response to each first transitional edge of the PWM signal from a first state to a second state, and continues to count the number of cycles while the PWM signal remains at the second state.

5. The digital incremental encoder of claim 4, wherein the counter is reset in response to each second transitional edge of the PWM signal from the second state to the first state.

6. The digital incremental encoder of claim 4, wherein the multi-bit output is latched by the latch in response to each second transitional edge of the PWM signal from the second state to the first state.

7. A digital incremental encoder system for generating output signals indicative of an angular position, a direction of rotation, and a speed of rotation of a shaft, comprising:
   an angular position sensor for generating a PWM signal indicative of the angular position of the shaft and a clock signal;
   a counter for receiving the PWM signal and the clock signal, and generating a multi-bit output; and
   a latch for latching the multi-bit output,
   wherein the output signals are generated using a first bit and a second bit of the latched multi-bit output, the output signals comprising the first bit,
   wherein the first bit and an XOR output generated from the first bit and the second bit have a quadrature phase relationship, the output signals further comprising the XOR output, and
   wherein the direction of rotation of the shaft can be derived from the quadrature phase relationship between the first bit and the XOR output.

8. The digital incremental encoder system of claim 7, further comprising an XOR gate for receiving the first bit and the second bit of the latched multi-bit output, and for outputting the XOR output.

9. The digital incremental encoder system of claim 7, further comprising an AND gate for receiving and AND'ing a plurality of bits of the latched multi-bit output to generate an index signal indicative of a 360 degree rotation of the shaft,
   wherein the plurality of bits can represent 100% duty cycle of the PWM signal.

10. The digital incremental encoder system of claim 7, wherein the counter starts counting the number of cycles of the clock in response to each first transitional edge of the PWM signal from a first state to a second state, and continues to count the number of cycles while the PWM signal remains at the second state.

11. The digital incremental encoder system of claim 10, wherein the counter is reset in response to each second transitional edge of the PWM signal from the second state to the first state.

12. The digital incremental encoder system of claim 10, wherein the multi-bit output is latched by the latch in response to each second transitional edge of the PWM signal from the second state to the first state.

13. The digital incremental encoder system of claim 7, wherein the angular position sensor is a non-contact angular position sensor (NCAPS) or a multi-turn non-contact angular position sensor (MT-NCAPS).

14. A method of generating output signals indicative of an angular position, a direction of rotation, and a speed of rotation of a shaft, comprising:
   receiving a PWM signal indicative of the angular position of the shaft;
   receiving a clock signal;
   start counting a number of cycles of the clock signal in response to a first transitional edge of the PWM signal from a first state to a second state;
   continue counting the number of cycles while the PWM signal remains at the second state to generate a multi-bit output representing the number of cycles counted;
   latching the multi-bit output;
   generating the output signals using a first bit and a second bit of the latched multi-bit output, the output signals comprising the first bit;
   XOR'ing the first bit and the second bit of the latched multi-bit output to generate an XOR output, the output signals further comprising the XOR output, wherein the first bit and the XOR output have a quadrature phase relationship; and
   deriving the direction of rotation of the shaft from the quadrature phase relationship.

15. The method of claim 14, further comprising resetting the counter in response to a second transitional edge of the PWM signal from the second state to the first state.

16. The method of claim 15, wherein said latching comprises latching responsive to the second transitional edge of the PWM signal.

17. The method of claim 14, further comprising generating the PWM signal using an angular position sensor.

18. The method of claim 17, wherein the angular position sensor is a non-contact angular position sensor (NCAPS) or a multi-turn NCAPS (MT-NCAPS).

19. The method of claim 14, further comprising AND'ing a plurality of bits of the latched multi-bit output to generate an index signal, wherein the plurality of bits can represent 100% duty cycle of the PWM signal.

20. A digital incremental encoder for generating output signals indicative of a linear position, a direction of linear translation, and a speed of linear translation of the linear position being monitored by a linear position sensor, comprising:
- a counter for receiving a PWM signal indicative of the linear position and a clock signal from the linear position sensor, and for generating a multi-bit output; and
- a latch for latching the multi-bit output,
- wherein the output signals are generated using a first bit and a second bit of the latched multi-bit output, the output signals comprising the first bit,
- wherein the first bit and an xOR output generated from the first bit and the second bit have a quadrature phase relationship, the output signals further comprising the XOR output, and
- wherein the direction of linear translation can be derived from the quadrature phase relationship between the first bit and the XOR output.

21. The digital incremental encoder of claim 20, further comprising an XOR gate for receiving the first bit and the second bit of the latched multi-bit output, and for outputting the XOR output.

* * * * *

UNITED STATES PATENT AND TRADEMARK OFFICE
CERTIFICATE OF CORRECTION

PATENT NO. : 7,015,832 B2
APPLICATION NO. : 10/853330
DATED : March 21, 2006
INVENTOR(S) : Madni et al.

It is certified that error appears in the above-identified patent and that said Letters Patent is hereby corrected as shown below:

Column 7, line 31,   Delete "PWK",
                     Insert --PWM--

Column 10, line 1,   Delete "xOR",
                     Insert --XOR--

Signed and Sealed this

Tenth Day of October, 2006

JON W. DUDAS
*Director of the United States Patent and Trademark Office*